(12) United States Patent
Altakrouri et al.

(10) Patent No.: US 12,519,841 B2
(45) Date of Patent: Jan. 6, 2026

(54) SYSTEM AND METHOD FOR CONTINUOUS AND AUTOMATED CYBERSECURITY MONITORING AND ASSESSMENT USING NATURAL LANGUAGE PROCESSING TOOLS

(71) Applicant: Saudi Arabian Oil Company, Dhahran (SA)

(72) Inventors: Bashar Altakrouri, Dhahran (SA); Kais Barakat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 221 days.

(21) Appl. No.: 18/321,469

(22) Filed: May 22, 2023

(65) Prior Publication Data

US 2024/0396946 A1 Nov. 28, 2024

(51) Int. Cl.
*H04L 9/40* (2022.01)
(52) U.S. Cl.
CPC .......... *H04L 63/205* (2013.01); *H04L 63/108* (2013.01); *H04L 2463/082* (2013.01)
(58) Field of Classification Search
CPC ....... G06N 20/00; H04L 63/10; H04L 63/108; H04L 63/20–205; H04L 63/1433; H04L 63/1441
See application file for complete search history.

(56) References Cited

U.S. PATENT DOCUMENTS

| | | | |
|---|---|---|---|
| 7,647,622 B1* | 1/2010 | Sobel | H04L 63/1425 709/229 |
| 2019/0182289 A1* | 6/2019 | White | G06F 21/6245 |
| 2022/0270008 A1 | 8/2022 | Milden et al. | |
| 2022/0300874 A1 | 9/2022 | Paquin | |
| 2022/0368728 A1 | 11/2022 | Murray et al. | |
| 2023/0100394 A1* | 3/2023 | Atkin | H04L 63/101 726/21 |

* cited by examiner

*Primary Examiner* — Kevin Bechtel
(74) *Attorney, Agent, or Firm* — Fish & Richardson P.C.

(57) ABSTRACT

A computer-implemented method includes: monitoring data sources that document (i) one or more digital projects, or (ii) one or more information assets, wherein the data sources are subject to constant updates time elapses; extracting, for each data source and using a natural language processing (NLP) module, an intent for a digital project, or an information asset, wherein the intent characterizes how the digital project plans to access the information asset on the enterprise network, and wherein the NLP module navigates semantic differences between the data sources; identifying, for the digital project (or the information asset), a cybersecurity risk level based on consolidating the extracted intent from each of the plurality of data sources; matching the digital project (or the information asset) with a set of control measures; and subsequently causing the set of control measures to be enforced on the enterprise network for the digital project.

20 Claims, 5 Drawing Sheets

SYSTEM AND METHOD FOR CONTINUOUS AND AUTOMATED CYBERSECURITY MONITORING AND ASSESSMENT USING NATURAL LANGUAGE PROCESSING TOOLS

TECHNICAL FIELD

This disclosure generally relates to cybersecurity monitoring and assessment.

BACKGROUND

Cybersecurity risk is defined by National Institute of Science & Technology (e.g., NIST SP 800-82 Rev. 2) as "the level of impact on agency operations (including mission, functions, image, or reputation), agency assets, or individuals resulting from the operation of an information system, given the potential impact of a threat and the likelihood of that threat occurring." Cybersecurity risks can expose organizations and individuals to liability, litigation, and various other undesirable outcomes. Examples of Cybersecurity risks may include reputational risk, fraud and financial crimes, vendor and third part risks, and compliance and legal risk.

SUMMARY

In one aspect, some implementations provide a computer-implemented method that includes: monitoring a plurality of data sources that document (i) one or more digital projects, or (ii) one or more information assets, wherein the one or more digital projects require access to the one or more information assets on an enterprise network, and wherein the plurality of data sources are subject to constant updates as time elapses; in response to an update, extracting, for each data source and using a natural language processing (NLP) module, an intent for a digital project or an information asset, wherein the intent characterizes (i) how the digital project intends to access the information asset on the enterprise network, or (ii) how the information asset intends to be accessed through the enterprise network, and wherein the NLP module navigates semantic differences between the plurality of data sources; identifying, for the digital project or the information asset, a cybersecurity risk level based on consolidating the extracted intent from each of the plurality of data sources; based on, at least in part, the identified cybersecurity risk level, matching the digital project, or the information asset, with a set of control measures; and subsequently causing the set of control measures to be enforced on the enterprise network for the digital project, or the information asset.

The implementations may include one or more of the following features.

Monitoring the plurality of data sources may include: launching software agents that automatically mine the plurality of data sources for records relating to the one or more digital projects, or the one or more information assets, wherein the records include records shared on an intranet of the enterprise and records released on social media outlets, and wherein the software agents are capable of detecting updates to the records as the updates become available. Each digital project may involve multiple parties of the enterprise that author the records and the updates to the records. The method may further include: coalescing the records, or the updates to the records, when consolidating the extracted intent from each of the plurality of data sources. Extracting the intent for the digital project may further include: detecting a syntactic structure of at least one sentence from each record; and extracting the intent expressed by each record based on, at least in part, the syntactic structure of the at least one sentence as well as the syntactic structure of at least one surrounding sentence. The method may further include: building a database of historical records including extracted intent of past digital projects and corresponding control measures; and correlating each record with the database of historical records when matching the digital project with a set of control measures. The method may further include: in response to detecting, in the data sources, an update relating to the digital project, extracting, using the NLP module, an intent from the update; identifying, for the digital project, an updated cybersecurity risk level based on, at least in part, the intent from the update; and based on, at least in part, the updated cybersecurity risk level, identifying an updated set of control measures; and subsequently causing the updated set of control measures to be enforced on the enterprise network for the digital project, or the information asset. The method may further include: comparing the identified cybersecurity risk level with a pre-determined baseline level; in response to determining a gap between the identified cybersecurity risk level and a pre-determined baseline level; and refining the set of control measures for the digital project or the information asset so that the gap can be mitigated. The method may further include: displaying the set of control measures to a cybersecurity operator on the enterprise network.

In another aspect, implementations provide a computer system comprising one or more hardware computer processors configured to perform operations of: monitoring a plurality of data sources that document (i) one or more digital projects, or (ii) one or more information assets, wherein the one or more digital projects require access to the one or more information assets on an enterprise network, and wherein the plurality of data sources are subject to constant updates as time elapses; in response to an update, extracting, for each data source and using a natural language processing (NLP) module, an intent for a digital project or an information asset, wherein the intent characterizes (i) how the digital project intends to access the information asset on the enterprise network, or (ii) how the information asset intends to be accessed through the enterprise network, and wherein the NLP module navigates semantic differences between the plurality of data sources; identifying, for the digital project or the information asset, a cybersecurity risk level based on consolidating the extracted intent from each of the plurality of data sources; based on, at least in part, the identified cybersecurity risk level, matching the digital project, or the information asset, with a set of control measures; and subsequently causing the set of control measures to be enforced on the enterprise network for the digital project, or the information asset.

The implementations may include one or more of the following features.

Monitoring the plurality of data sources may include: launching software agents that automatically mine the plurality of data sources for records relating to the one or more digital projects, or the one or more information assets, wherein the records include records shared on an intranet of the enterprise and records released on social media outlets, and wherein the software agents are capable of detecting updates to the records as the updates become available. Each digital project may involve multiple parties of the enterprise that author the records and the updates to the records. The operations may further include: coalescing the records, or the updates to the records, when consolidating the extracted intent from each of the plurality of data sources. Extracting the intent for the digital project may further include: detecting a syntactic structure of at least one sentence from each record; and extracting the intent expressed by each record based on, at least in part, the syntactic structure of the at least one sentence as well as the syntactic structure of at least one surrounding sentence. The operations may further include: building a database of historical records including extracted intent of past digital projects and corresponding control measures; and correlating each record with the database of historical records when matching the digital project with a set of control measures. The operations may further include: in response to detecting, in the data sources, an update relating to the digital project, extracting, using the NLP module, an intent from the update; identifying, for the digital project, an updated cybersecurity risk level based on, at least in part, the intent from the update; and based on, at least in part, the updated cybersecurity risk level, identifying an updated set of control measures; and subsequently causing the updated set of control measures to be enforced on the enterprise network for the digital project, or the information asset. The operations may further include: comparing the identified cybersecurity risk level with a pre-determined baseline level; in response to determining a gap between the identified cybersecurity risk level and a pre-determined baseline level; and refining the set of control measures for the digital project or the information asset so that the gap can be mitigated. The operations may further include: displaying the set of control measures to a cybersecurity operator on the enterprise network.

In yet another aspect, non-transitory computer-readable medium comprising software instructions that, when executed, cause a computer processor to perform operations of: monitoring a plurality of data sources that document (i) one or more digital projects, or (ii) one or more information assets, wherein the one or more digital projects require access to the one or more information assets on an enterprise network, and wherein the plurality of data sources are subject to constant updates as time elapses; in response to an update, extracting, for each data source and using a natural language processing (NLP) module, an intent for a digital project or an information asset, wherein the intent characterizes (i) how the digital project intends to access the information asset on the enterprise network, or (ii) how the information asset intends to be accessed through the enterprise network, and wherein the NLP module navigates semantic differences between the plurality of data sources; identifying, for the digital project or the information asset, a cybersecurity risk level based on consolidating the extracted intent from each of the plurality of data sources; based on, at least in part, the identified cybersecurity risk level, matching the digital project, or the information asset, with a set of control measures; and subsequently causing the set of control measures to be enforced on the enterprise network for the digital project, or the information asset.

Implementations may include one or more of the following features.

Monitoring the plurality of data sources may include: launching software agents that automatically mine the plurality of data sources for records relating to the one or more digital projects, or the one or more information assets, wherein the records include records shared on an intranet of the enterprise and records released on social media outlets, and wherein the software agents are capable of detecting updates to the records as the updates become available. Each digital project may involve multiple parties of the enterprise that author the records and the updates to the records. The operations may further include: coalescing the records, or the updates to the records, when consolidating the extracted intent from each of the plurality of data sources. Extracting the intent for the digital project may further include: detecting a syntactic structure of at least one sentence from each record; and extracting the intent expressed by each record based on, at least in part, the syntactic structure of the at least one sentence as well as the syntactic structure of at least one surrounding sentence. The operations may further include: building a database of historical records including extracted intent of past digital projects and corresponding control measures; and correlating each record with the database of historical records when matching the digital project with a set of control measures. The operations may further include: in response to detecting, in the data sources, an update relating to the digital project, extracting, using the NLP module, an intent from the update; identifying, for the digital project, an updated cybersecurity risk level based on, at least in part, the intent from the update; and based on, at least in part, the updated cybersecurity risk level, identifying an updated set of control measures; and subsequently causing the updated set of control measures to be enforced on the enterprise network for the digital project, or the information asset. The operations may further include: comparing the identified cybersecurity risk level with a pre-determined baseline level; in response to determining a gap between the identified cybersecurity risk level and a pre-determined baseline level; and refining the set of control measures for the digital project or the information asset so that the gap can be mitigated. The operations may further include: displaying the set of control measures to a cybersecurity operator on the enterprise network.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to system and technology to provide continuous and automatic monitoring of an enterprise network to assess cybersecurity risks as various sections of the enterprise pursue digital projects that implicate data access issues in real-time. For example, the implementations can monitor digital projects and digital assets of the enterprise during the full lifecycle based on natural language understanding of, for example, the intents of the digital projects. The implementations provide a novel approach to identify the intentions (e.g., intended functionalities, scope, usage, etc.) from a planned project or asset and recommend the control measures accordingly. A continuous monitoring of the project or asset during the full lifecycle can enable the security professionals to recognize changes or evolution in intents and accordingly implement adaptive changes in the control measures. Such capabilities are desirable and advantageous for accommodating increasingly complex and distributed projects involving a vast number of small micro services and modules because the reality renders traditional approaches (e.g., those involving a human expert) impracticable, if not impossible, to provide continuous and deep assessment of the differences between the design and build of the information asset.

Recent technological advances have witnessed wide spread adoption of digital transformation in organizations (such as enterprises). This digital transformation has led to extensive involvement of the chief information security officer (CISO) and information technology (IT) leaders in the digitalization and automation projects (shortly referred to herein as projects) as well as information asset (referred to shortly as asset). Here, a digital project can refer to a project aiming to automate a business process or implement a technology tool (e.g., an IT system). An information asset can refer to a technology tool (e.g., an IT system), logical or physical data entity, information processing facility, 3rd party IT services that carry, store, save or process organization valued information and processes (e.g., cloud service such as AWS). Against this backdrop, a mature cybersecurity program is commonly practiced in which cybersecurity requirements are identified and addressed as part of the project management methodology and procedures in order to achieve proper protection (e.g., confidentiality, integrity and availability) of information and technology assets generated as a result of the project. Under such programs, cybersecurity risk assessments are provided to identify security requirements for the projects to ensure secure deployment and adoption through scalable, reliable, and secure Information Technology (IT) & Operational Technology (OT) environments.

Traditionally, cybersecurity risks and requirements are identified early in the project or asset lifecycle. For example, the project team can review the project or asset objective, design, and deliverables with cybersecurity subject matter experts (SMEs). The review can take place as part of the definition and planning stage of a project. The common practice is that this engagement takes place once during the lifecycle of the project and a final pre-go-live test is conducted to ensure all requirements have been addressed as recommended by, for example, the cybersecurity SME.

Existing solutions are inadequate in handling nascent technical challenges in the digital transformation. First, existing solutions technically cannot perform continuous risk assessment to insure correct level of security enforcement in place to securely satisfy critical business activities during the full cycle of the project. This demand stems from the dynamic and changing context of the project or asset and the deviations from the original defined baseline. The constant changes and deviations have made it challenging and time-consuming for human experts to personally monitor the process of cybersecurity assessment that maps project/asset intents to the cyber security risk mitigations and control measures.

Second, existing solutions are prone to variations in human input. Risk and cybersecurity requirements identified may depend on the knowledge, background, and experience of the cybersecurity SME. This variation among different human experts can lead to inconsistency in the output.

Third, existing solutions cannot handle quality assessment when faced with variations in the business language and articulation of the information provided for the project/asset. Along those lines, the provided information may present variations in the depth of details as well as the dissemination channel of information.

Implementations of the present disclosure can identify cybersecurity risks based on the project's intents by understanding the project information documents (e.g., project description, requirements, etc.) and other related enrichments (e.g., project announcements, system logs, new letters, etc.) at the full life cycle using natural language processing techniques. Faced with different ways of articulating the projects (such as, e.g., the required capabilities, requirements, usage purpose, usage environment, scope, user population, and related legislations), cybersecurity assessment can be conducted with consistency. Additionally, the implementations can enhance and curate individually extracted intents based on a holistic understanding of the intention of the project and cross validating the intents over related documents. Such nascent features can improve the confidence that the articulation of the project/asset information documents depicts the correct intention of the writer of the document. The improvement can mitigate the instances in which the writers/authors may fail to express their intention in in words inadequately in some documents.

In summary, implementations of the present disclosure can intelligently generate an explainable security assessment and recommendations, by dynamically detecting the intentions of the projects and assets through the understanding of project requirements and the required IT capabilities and curating individually extracted intents based on a holistic understanding of the intention of the project and cross validating the intents. The implementations may additionally map project and asset intents to the cyber security risk mitigations and controls regardless of the way the project and its requirements are documented. Further, the implementations can capture dynamic and changing context of the project and assets and the deviations from the original defined baseline. Moreover, the implementations can utilize process mining techniques to uncover relevant insights about performance and compliance of operational processes that relate to the introduced tool or capability. The implementations can also utilize enrichment of the assessment by augmenting the project with assessment and recommendation based on historical data and projects with similar intents.

Figure 1:
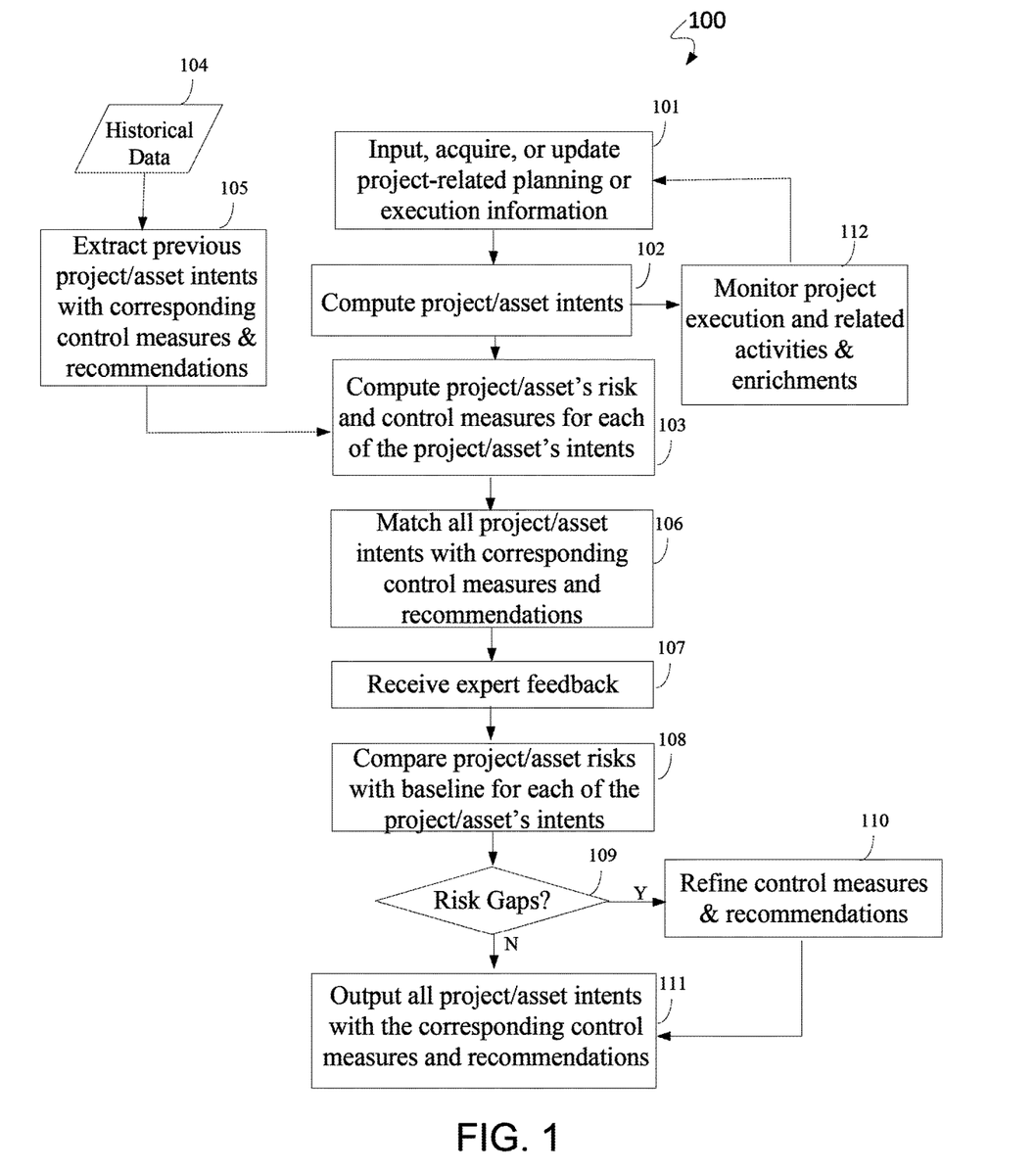
FIG. 1 is a diagram illustrating an example of a configuration using natural language processing according to some implementations of the present disclosure.

Referring to FIG. 1 illustrating diagram 100, the implementations can provide automatic, dynamic and continuous cybersecurity assessment and recommendation for handling projects being developed at an organization in a distributed matter through the organization's network. Initially, the process may gather all project-related planning and execution information as input (101). In some cases, the input can be in the form of updates (e.g., as the project progresses). For example, implementations may employ bot-like agents that reside on the enterprise network to gather documents provided by project teams describing or outlining on-going projects. The bot-like agents may also follow the public account of project teams on social media. Moreover, the bot-like agents may crawl the internet for updates provided by third parties (e.g., third parties mentioned by project teams a collaborators, suppliers, or partners). Similar to the web crawlers used by search engines of Google, the bot-like agents can gather information and updated information of on-going projects by automatically monitoring the intranet of the enterprise network as well as the outside Internet of the enterprise.

The process may then compute, for each digital project/information asset, the associated intent (102). The intent of a digital project may refer to how the digital project intends to access an information asset on the enterprise network. The intent of an information asset may refer to how the information asset may intend to be accessed through the enterprise network. The computation can use natural language processing techniques, as further illustrated in examples from FIGS. 2-3. Referring to diagram 200, an example is provide to illustrate non-employee access to an asset from outside the enterprise network. As illustrated, product owner 201, may operate as a business stakeholder who owns the development of a project. Product owner 201 may generate project descriptions, project updates, and meeting minutes. The information may be stored as emails, email attachments, shared notes, or similar type of documents (202A). Separately, IT architect 211 may also be involved in the same project. The IT architect 211 may provide a more technical description of the project (212A), which also goes to digital storage on the enterprise network. The digital storage on the enterprise network can be cloud-based or centralized. In short, projects described from different stakeholders can be stored digitally (221).

Figure 2:
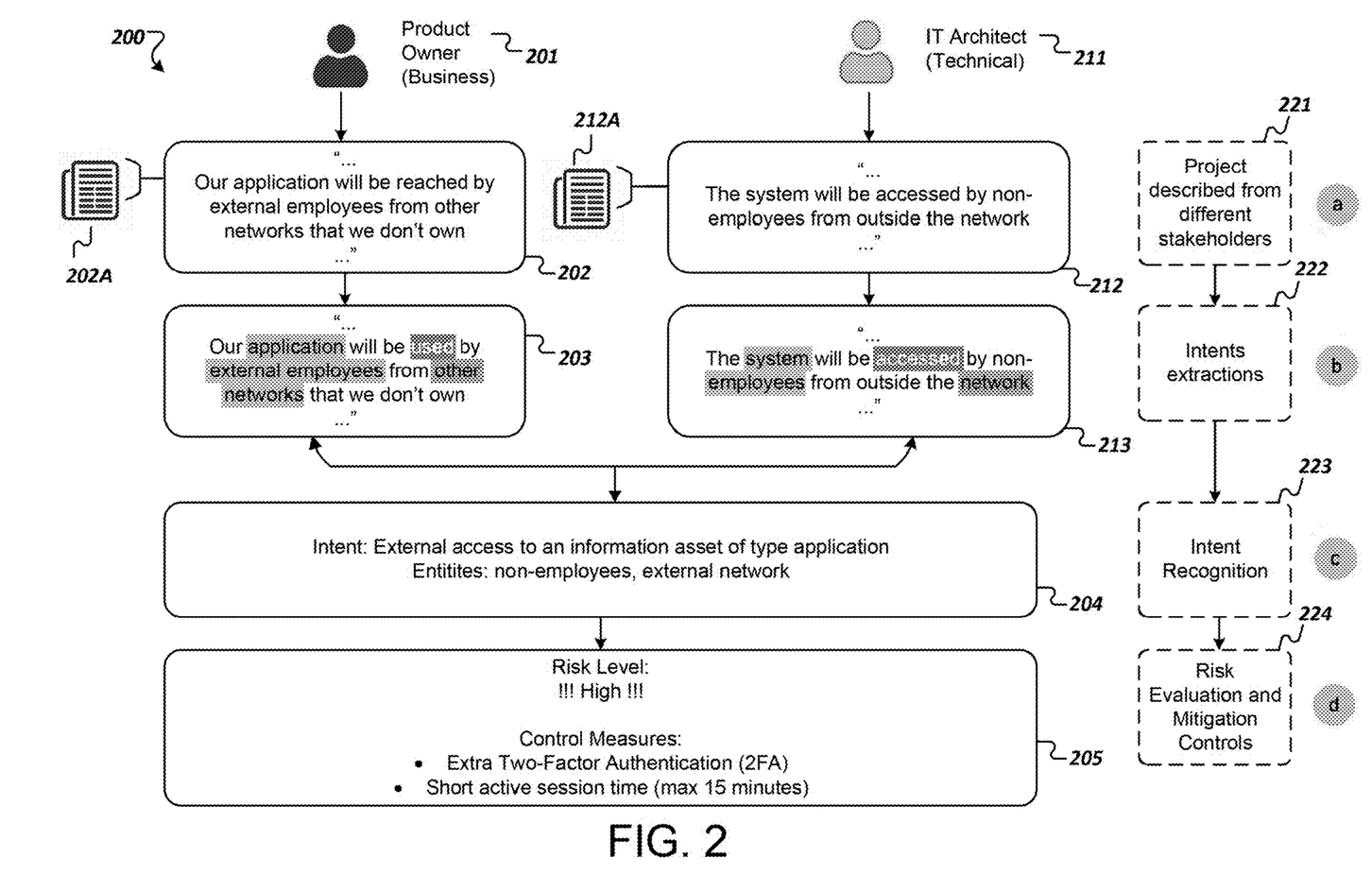
FIG. 2 illustrates an example of continuous and automated cybersecurity assessment according to some implementations of the present disclosure.

Using the bot-like agents that reside on the enterprise network, the implementations can gather and then analyze the information in digital storage. The bot-like agents may coalesce information in separate digital storage based on, for example, project codes, or semantic mutual references. As illustrated, the implementations can analyze description 202 from product owner 201 to generate a textual analysis based on natural language understanding, which reveals a distilled line of words including: "application . . . used . . . external employees . . . other networks," as shown in block 203. Similarly, the implementations analyze description 202 from product owner 201 to generate a distilled line of words including: "system . . . accessed . . . non-employees . . . outside the network," as show in block 213. In short, the implementations may then perform intent extractions (222).

The implementations can involve natural language processing (NLP) techniques (e.g., an NLP module) to conduct grammatical analysis to understand the structure of sentences and identify the relationships between different parts of sentence (or surrounding sentences, or sentences in surrounding paragraphs) For example, in a dependency parse, each word in the sentence is assigned a part-of-speech tag (e.g., noun, verb, adjective), and a dependency label that describes the relationship between the word and its dependents. Once the syntactic structure of a sentence has been detected, the implementations can use this information to extract meaning from the text. For example, implementations can identify the subject of a sentence (e.g., whether the subject involves an external employees). The implementations may detect a tense of the sentence, as well as the verb being used. Some implementations may perform intent extraction using machine learning models to classify text into different intent categories. The models can be trained on labeled data, where each example includes a text input and an associated intent label. The models learn to recognize patterns in the text that are associated with each intent label and can then make predictions on new, unlabeled text inputs. Indeed, the implementations can use a variety of different NLP approaches for intent extraction, ranging from rule-based methods to more sophisticated deep learning models. Examples of the NLP techniques can include using bag-of-words representations or word embeddings to represent the text, and using algorithms such as support vector machines (SVMs) or recurrent neural networks (RNNs) to perform the classification.

Based on the extracted intent from related threads of different parties, implementations can then generate a summary 204 for the project including intent ("External access to an information asset of type application") and entities ("non-employees, external network"). This step is known as intent recognition 223. As illustrated, while two different persons having different technical expertise and backgrounds write the project information document differently (e.g., writing style, terms, etc), the implementations can derive and reconstruct the same intent based on a holistic understanding using the natural language processing (NLP) module which may incorporate one or more NLP techniques.

Returning to FIG. 1, the process may then compute, for each recognized intent of a project (or an information asset), the project's cybersecurity risk and control measures (103). The cybersecurity risk can be a classified risk level while the control measures can include a set of features for handling a certain risk level. For example, diagram 200 shows, in block 205, a risk level of high and control measures that include "extra two-Factor Authentication" and "Short active session time (max 15 minutes)." This step is known as the risk evaluation & mitigation controls (224).

Some implementations may enrich the computation using historical data (104), which can include past records of projects/assets' intents and the corresponding risk classification and control measures. By extracting earlier intent and the corresponding control measures and risk-specific recommendations (105), the process can leverage past records to enrich the computation of current project's risk classification and control measures using, for example, correlational techniques. The process may then match all project/asset intents with control measures and recommendations (106).

Thereafter, the process may present the computed intent and the corresponding control measures and recommendations to, e.g., a subject matter expert. The process may then receive feedback from the subject matter expert (107). This user feedback may be used to drive additional revision for future computation of project's control measures. Indeed, the implementations can implement supervised learning when handling the classification of the intents and the association of the intents with a ground-truth (i.e., cybersecurity manuals, corporate measures and guidelines) and corrective measures. Thereafter, the process may compare project/asset risks with a baseline for each of the project's (or asset's) intents (108). The comparison can identify risk gaps (109). In response to identifying risk gaps, the implementations may proceed to revise control measures and recommendations (110). The implementations may then output all project/asset intents, along with the recommendations proposed for the identified risks and control measures (111). Some implementations may additionally monitor project execution information and related activities & enrichments to project/asset intents (112) so that the process can implement a continuous detection of change in project's (or asset's) intent, as the project is being executed.

Figure 3:
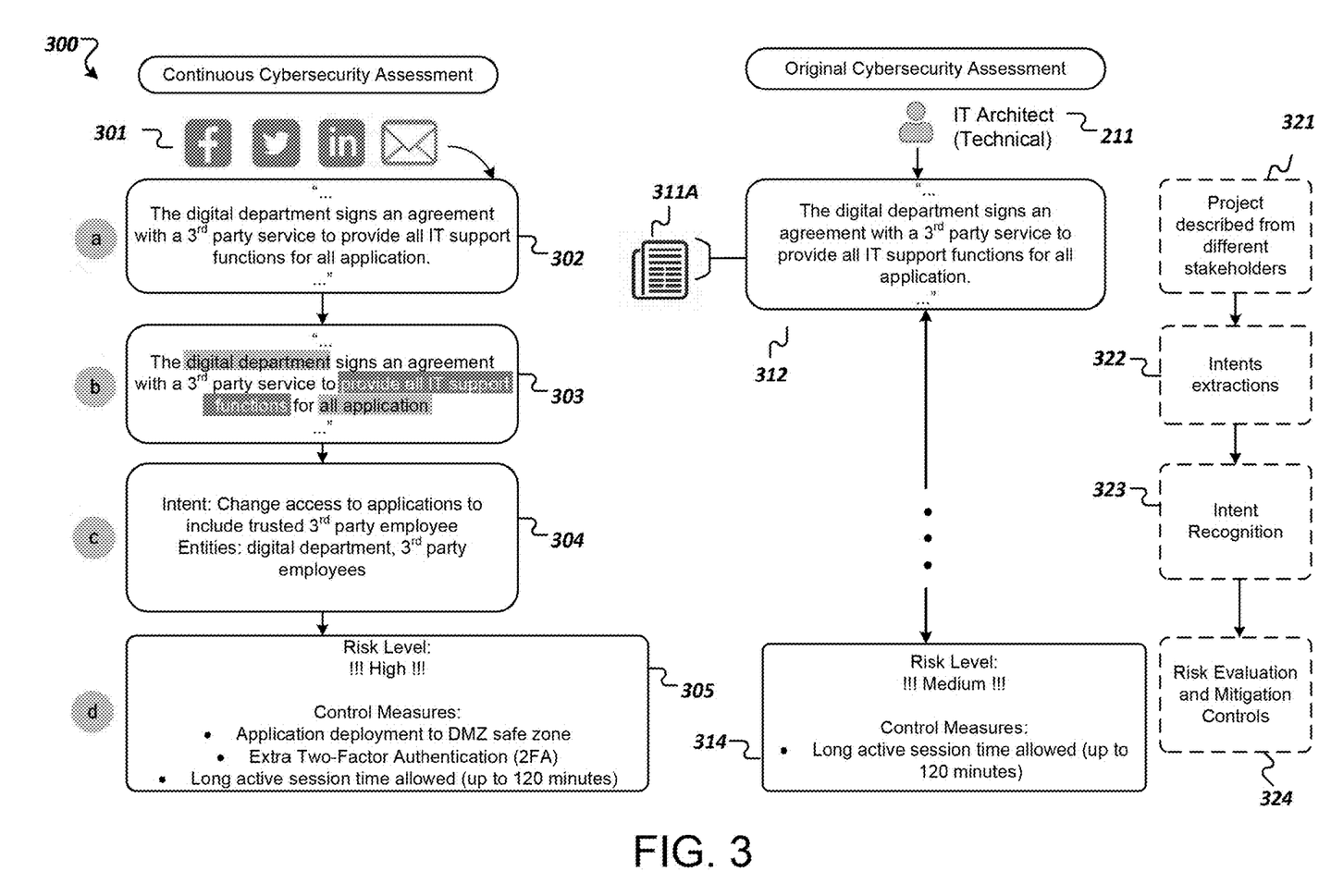
FIG. 3 illustrates another example of continuous and automated cybersecurity assessment according to some implementations of the present disclosure.

The implementations can monitor the progress of each project so that updates can be analyzed. Some implementations can further incorporate analysis of public postings by the parties involved. In diagram 300 of FIG. 3 illustrating outsourcing of a previously developed functionality, the implementations can follow a team's public account on Facebook, Twitter, LinkedIn, and other outlets, (301), e.g., after an original cybersecurity assessment. Monitoring may include different data sources such as internal event logs, IT support tickets, monitoring tools, corporate information dissemination channels (e.g., management highlights, newsletters and announcements). In this example, a system was internally designed, developed and deployed. The original design would have the system accessed and hosted internally and used only by internal employees.

As illustrated, the implementations can analyze a public newsletter released by a party. The newsletter reports that "the digital department signs an agreement with a $3^{rd}$ party service to provide all IT support function for all applications," as shown in block 302. This corresponds to step 321 for gathering information of projects described from different stakeholders. Because the functionality has been outsourced, the intent of the project has been changed as the system and some related data assets will be accessed by external access (i.e., support personnel). However, the system will continue to be hosted and used internally according to the original intent.

In this example, the implementations may then perform intents extraction 322 to extract the intent based on information from the newsletter. As shown in block 303, the intent is identified as "digital department . . . provide all IT support functions . . . all applications." Based on the intent extract, the implementations may then generate an output 304 including intent ("Change access to applications to include trusted $3^{rd}$ party employee") and entities ("digital department, $3^{rd}$ party employees"). This corresponds to the intent recognition step 323. The implementations may then compute the project's cybersecurity risk and control measures. As shown in block 305, the risk level is high and the control measures include: application deployment to DMZ safe zone, extra two-factor authentication, and long active session time allowed (up to 120 minutes). Separately, the implementations have an original cybersecurity risk evaluation & mitigation controls, for example, from IT architect 211. As illustrated, original assessment of the project's cybersecurity risk based on archived documentation in storage (311A) has extracted intent 312 ("the system will be accessed by employees from the organization's inside network only"). The earlier extracted intent may have a corresponding risk level of medium with control measures that include long active session time (up to 120 minutes), as shown in block 314. Based on the information from project update, the project's intent has changed in scope, and consequently, the risk level and control measures need to be updated as well. This corresponds to risk evaluation and mitigation controls in step 324. The iterative nature of the adjustment is reflected in the description above.

In summary, the newly detected intent can trigger a reevaluation of the cybersecurity risks, which can lead to new mitigation controls accordingly. The new set of control measures can overrides the initial cybersecurity assessment.

Figure 4:
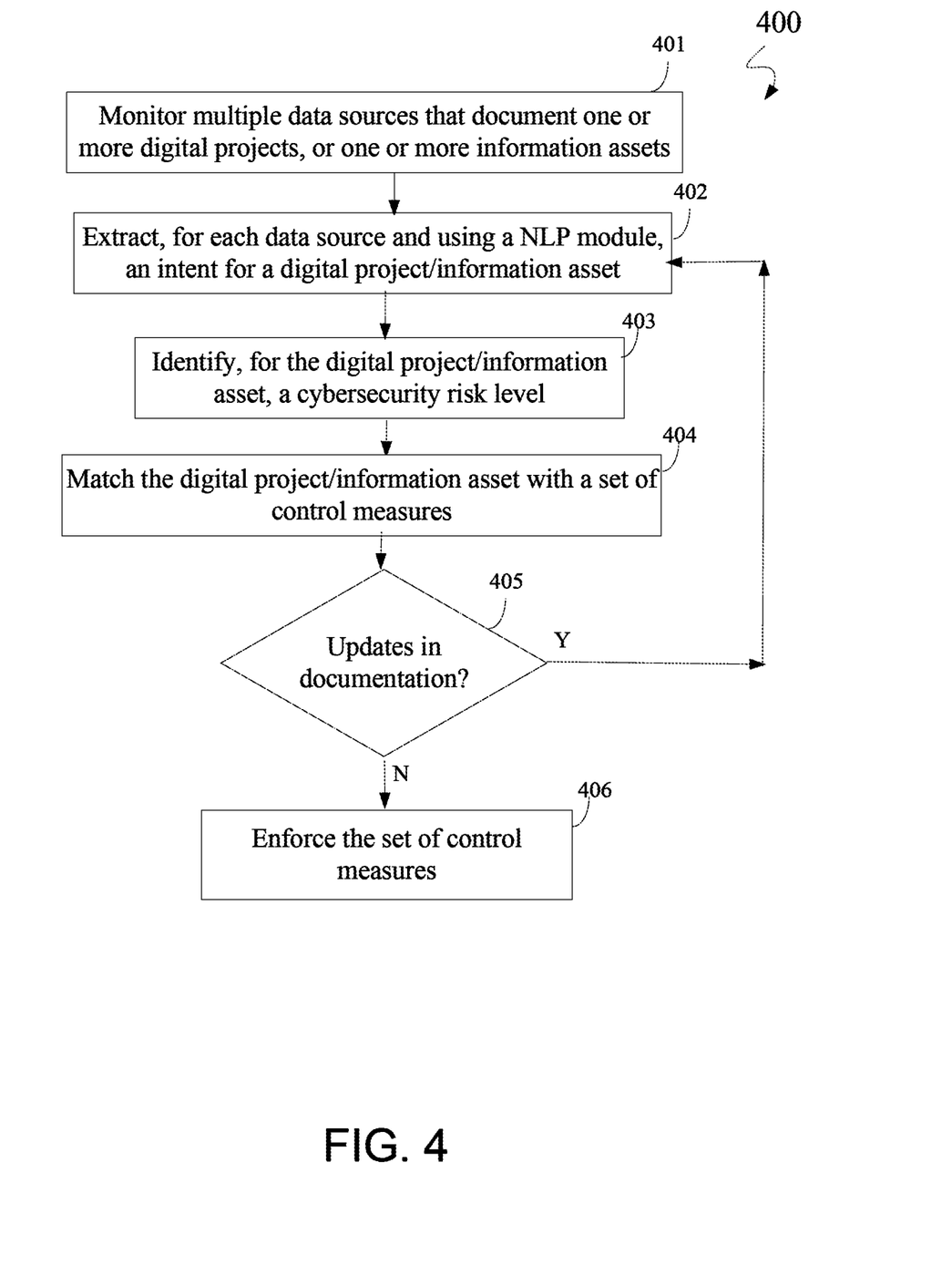
FIG. 4 is a flow chart showing a process according to some implementations of the present disclosure.

FIG. 4 is a flow chart 400 illustrating an example of a process according to some implementations of the present disclosure. The process may monitor multiple data sources that document one or more digital projects requiring access to an enterprise network, or one or more digital assets on the enterprise network (401). The data sources may include records shared on an intranet of the enterprise, as well as records released on social media. Various sections (i.e., multiple parties) of the enterprise, when pursuing the digital project (or creating/maintaining the information asset), may have authored documentations about the digital project/information asset, for example, discussing how access to the enterprise network may play out, as discussed above in association with FIGS. 1-3. The process may launch software agents (e.g., web crawlers like those used in Google search engine) to mine the multiple data sources for records relating to the digital projects/information assets. In this manner, the data sources can be monitored continuously and automatically. The assessment can be triggered, for example, by a submission event at the approval time of a digital project (or maintenance interval of an information asset), an update of the project specification and documentation, a media post/publication related to the project (or asset), and an event log. These trigger events are not mutually exclusive.

The process may then extract, for each data source and using a natural language processing (NLP) module, an intent for a digital project (or an information asset) (402). For example, the NLP module may incorporate one or more NLP techniques and can detect a syntactic structure of at least a sentence from each record. The intent may then be extracted based on, at least in part, the syntactic structure of the at least one sentence as well as the syntactic structure of at least one surrounding sentence. The NLP module may navigate the varied writing styles from different parties who may have different preferences for synonyms and grammar. Another level of navigation can be achieved by associating the different pieces of project documentations that are potentially relevant to one desired function (e.g., two requirements written for the same function with one written as part of the business use case description by the product owner and another one written by an IT architect describing the implementation of the technical requirements).

The process may then identify, for each digital project/information asset, a cybersecurity risk level based on consolidating the extracted intent from each of the plurality of data sources (403). For example, the process may coalesce the records, or the updates to the records, when consolidating the extracted intent from each of the plurality of data sources. By way of illustration, to the extent that the digital project/information asset may involve multiple parties, the records (or updates to the records) can be coalesced. Moreover, multiple data records by the parties can reinforce the intent extraction. By way of illustration, different work products (e.g., design documents, technical documents, technical drawings) for the same digital project/information asset are often written by different persons involved and shared within the same knowledge pool and project channels (e.g., using common tools such as Jira, confluence, slack, etc.). Hence, the resources associated with a certain project (or a particular information asset) are usually known and easily associated with a particular digital project/information asset. Additionally, corporate and enterprise knowledge-based systems, resources are often tagged for easy identification, which can be linked to a particular digital project/information asset.

The process may then match the digital project with a set of control measures with respect to accessing the enterprise network (404). For example, the process may involve building a database of historical records including extracted intent of past digital projects and corresponding control measures. Using the database of historical records, the process may correlate each record with past records when matching the digital project with a set of control measures.

The process may be iterative in that the process may monitor the data sources for updates to the records (405). For example, the process may incorporate process mining techniques such as process discovery and conformance checking to reveal changes to the on-going digital projects. The changes can be introduced from a control flow (e.g., optimal or recommended path for performing a process) and organizational perspectives (e.g., resources involved and the optimal organizational structure). The implementations can capture any action, system-to-system or people-to-system, as part of the event logs being checked against the documented intention of the digital project. Hence, performance and compliance deviations from the baseline can be spotted and mitigation actions can be triggered (e.g., initiating a new cybersecurity assessment. In response to detecting updates to the records, the process may revisit step 402 to extract the intent from the updates. Otherwise, the process may proceed to enforcing the set of control measures on the enterprise network (406). For example, the process may recommend the set of control measures by displaying the set of control measures to a cybersecurity operator on the enterprise network.

Thus, the implementations can automate cybersecurity and utilize AI to accelerate the adoptability of most up-to-date control measures to mitigate the dynamic nature of cybersecurity risks. The implementations can provide a system and method for continuous and automated cybersecurity assessment for digital projects (referred to shortly as projects) and information assets (referred to shortly as asset) during the full lifecycle based on natural language understanding especially intents.

The implementations can identify cybersecurity hazards and recommend the control mitigation measures based on the project's or asset's intentions and intended functionality regardless of business language used to describe and express the project/asset. Notwithstanding the varied articulation of the projects (such as its required capabilities, requirements, usage purpose, usage environment, scope, user population, and related legislations) by different participants, the cybersecurity assessment can be conducted the same way. The advantages of the implementations become particularly attractive in a scale-up phase, where more agile practices can be introduced, more diverse experts can be involved and more interdisciplinary teams can be formed at different stage of the projects. For example, it has become more and more likely that a mix of business and technical authors from multiple disciplines contribute to defining project and asset information documents.

The implementations can achieve continuously monitoring of the project or asset full lifecycle to recognize changes in the project's intentions and to adopt matching control measures accordingly (i.e., continuous intent monitoring and cybersecurity assessment). This ability can be a preferred advantage given the increasingly complex and distributed design of the projects and assets. For example, when projects and assets involve an increasing number of small micro services and modules, existing solutions using a human expert would be unable to continuously and adequately conduct cybersecurity assessment. The implementations, however, can aggregate and acquire information from multiple project information documents (e.g., project description, and requirements) and other related enrichments (e.g., project announcements, system logs, new letters, etc.) during the full life cycle.

The implementations can enhance and curate individually extracted intents based on a holistic understanding of the intention of the project and cross validating the intents. Such features are advantageous for consolidating varied articulation of the project/asset information documents to uncover the correct intention of each project. The features can be particularly attractive when some writers/authors provide inadequate expression to document an aspect of the project or asset.

Figure 5:
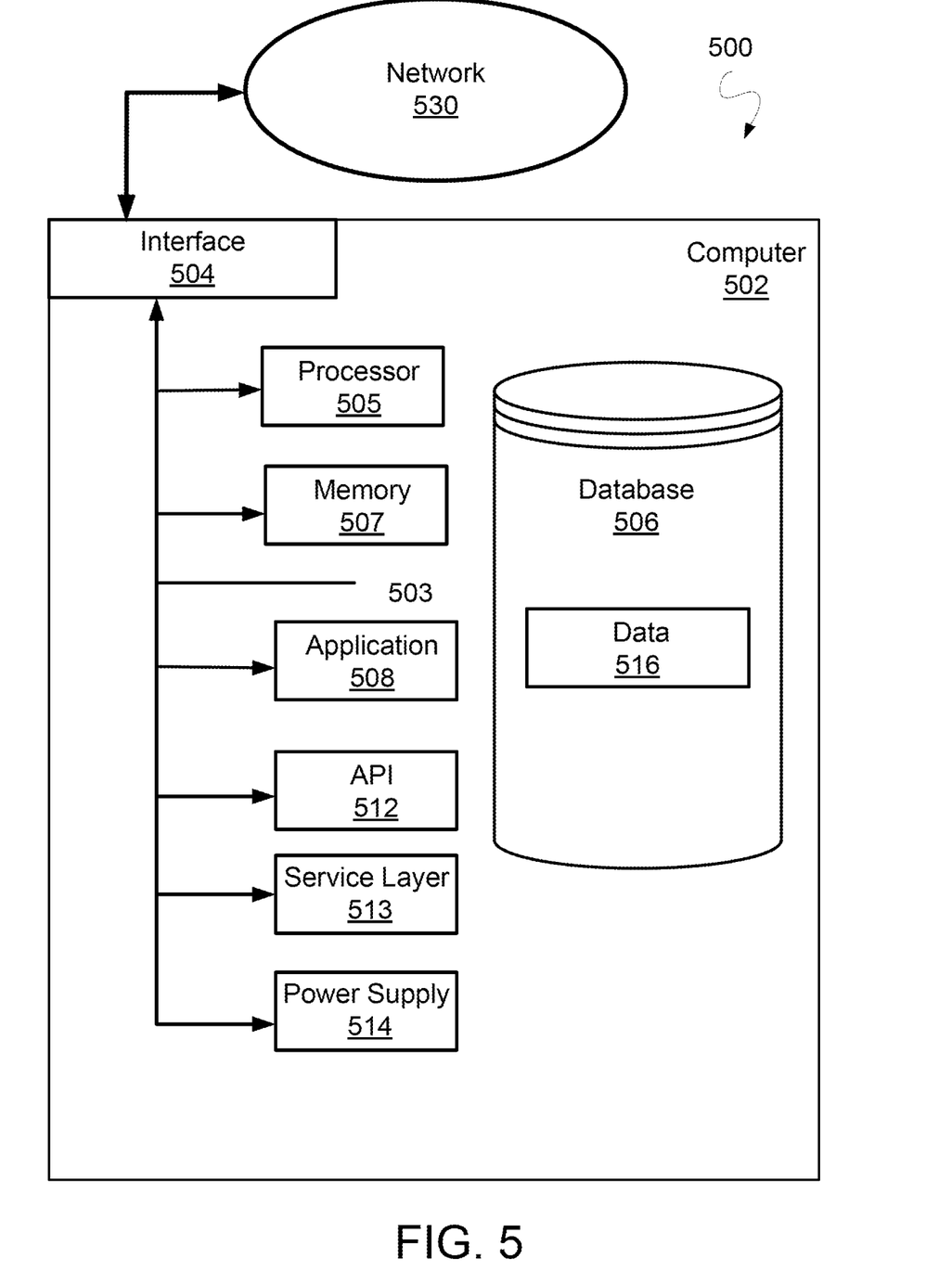
FIG. 5 is a block diagram illustrating an example of a computer system used to provide computational functionalities associated with described algorithms, methods, functions, processes, flows, and procedures, according to an implementation of the present disclosure.

FIG. 5 is a block diagram 500 illustrating an example of a computer system 500 used to provide computational functionalities associated with described algorithms, methods, functions, processes, flows, and procedures, according to an implementation of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can comprise a computing device that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a computer system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

The computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users, external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds data 516 including, for example, data from records 202A, 212A, 311A, and historical data 104, as explained in more detail in association with FIGS. 1-3.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
    monitoring a plurality of data sources that document (i) one or more digital projects, or (ii) one or more information assets, wherein the one or more digital projects require access to the one or more information assets on an enterprise network, and wherein the plurality of data sources are subject to constant updates as time elapses;
    in response to an update, extracting, for each data source and using a natural language processing (NLP) module, an intent for a digital project or an information asset, wherein the intent characterizes (i) how the digital project intends to access the information asset on the enterprise network, or (ii) how the information asset intends to be accessed through the enterprise network, and wherein the NLP module navigates semantic differences between the plurality of data sources;

identifying, for the digital project or the information asset, a cybersecurity risk level based on a correlation between a consolidated intent derived from consolidating the extracted intent from each of the plurality of data sources and historical records, each historical record comprising an extracted intent of past digital projects, corresponding cybersecurity risk level, and corresponding control measures;

based on, at least in part, the correlation between the consolidated intent and the historical records, matching the digital project, or the information asset, with a set of control measures; and subsequently causing the set of control measures to be enforced on the enterprise network for the digital project, or the information asset.

2. The computer-implemented method of claim 1, wherein monitoring the plurality of data sources comprises:

launching software agents that automatically mine the plurality of data sources for records relating to the one or more digital projects, or the one or more information assets, wherein the records include records shared on an intranet of the enterprise and records released on social media outlets, and wherein the software agents are capable of detecting updates to the records as the updates become available.

3. The computer-implemented method of claim 2, wherein each digital project involves multiple parties of the enterprise that author the records and the updates to the records.

4. The computer-implemented method of claim 3, further comprising:

coalescing the records, or the updates to the records, when consolidating the extracted intent from each of the plurality of data sources.

5. The computer-implemented method of claim 2, wherein extracting the intent for the digital project further comprises:

detecting a syntactic structure of at least one sentence from each record; and extracting the intent expressed by each record based on, at least in part, the syntactic structure of the at least one sentence as well as the syntactic structure of at least one surrounding sentence.

6. The computer-implemented method of claim 5, further comprising:

building a database of historical records including extracted intent of past digital projects and corresponding control measures; and correlating each record with the database of historical records when matching the digital project with a set of control measures.

7. The computer-implemented method of claim 5, further comprising:

in response to detecting, in the data sources, an update relating to the digital project, extracting, using the NLP module, an intent from the update;

identifying, for the digital project, an updated cybersecurity risk level based on, at least in part, the intent from the update;

based on, at least in part, the updated cybersecurity risk level, identifying an updated set of control measures; and subsequently causing the updated set of control measures to be enforced on the enterprise network for the digital project, or the information asset.

8. The computer-implemented method of claim 1, further comprising:

comparing the identified cybersecurity risk level with a pre-determined baseline level;

in response to determining a gap between the identified cybersecurity risk level and a pre-determined baseline level; and refining the set of control measures for the digital project or the information asset so that the gap can be mitigated.

9. The computer-implemented method of claim 8, further comprising:

displaying the set of control measures to a cybersecurity operator on the enterprise network.

10. A computer system comprising one or more hardware computer processors configured to perform operations of:

monitoring a plurality of data sources that document (i) one or more digital projects, or (ii) one or more information assets, wherein the one or more digital projects require access to the one or more information asset on an enterprise network, wherein the plurality of data sources are subject to constant updates as time elapses;

in response to an update, extracting, for each data source and using a natural language processing (NLP) module, an intent for a digital project or an information asset, wherein the intent characterizes (i) how the digital project intends to access the information asset on the enterprise network, or (ii) how the information asset intends to be accessed through the enterprise network, and wherein the NLP module navigates semantic differences between the plurality of data sources;

identifying, for the digital project or the information asset, a cybersecurity risk level based on a correlation between a consolidated intent derived from consolidating the extracted intent from each of the plurality of data sources and historical records, each historical record comprising an extracted intent of past digital projects, corresponding cybersecurity risk level, and corresponding control measures;

based on, at least in part, the correlation between the consolidated intent and the historical records, matching the digital project, or the information asset, with a set of control measures; and subsequently causing the set of control measures to be enforced on the enterprise network for the digital project, or the information asset.

11. The computer system of claim 10, wherein monitoring the plurality of data sources comprises:

launching software agents that automatically mine the plurality of data sources for records relating to the one or more digital projects, or the one or more information assets, wherein the records include records shared on an intranet of the enterprise and records released on social media outlets, and wherein the software agents are capable of detecting updates to the records as the updates become available.

12. The computer system of claim 11, wherein each digital project involves multiple parties of the enterprise that author the records and the updates to the records.

13. The computer system of claim 12, wherein the operations further comprise:
coalescing the records, or the updates to the records, when consolidating the extracted intent from each of the plurality of data sources.

14. The computer system of claim 10, wherein extracting the intent for the digital project further comprises:
detecting a syntactic structure of at least one sentence from each record; and
extracting the intent expressed by each record based on, at least in part, the syntactic structure of the at least one sentence as well as the syntactic structure of at least one surrounding sentence.

15. The computer system of claim 14, wherein the operations further comprise:
building a database of historical records including extracted intent of past digital projects and corresponding control measures; and
correlating each record with the database of historical records when matching the digital project with a set of control measures.

16. The computer system of claim 14, wherein the operations further comprise:
in response to detecting, in the data sources, an update relating to the digital project, extracting, using the NLP module, an intent from the update;
identifying, for the digital project, an updated cybersecurity risk level based on, at least in part, the intent from the update;
based on, at least in part, the updated cybersecurity risk level, identifying an updated set of control measures; and
subsequently causing the updated set of control measures to be enforced on the enterprise network for the digital project, or the information asset.

17. The computer system of claim 10, wherein the operations further comprise:
comparing the identified cybersecurity risk level with a pre-determined baseline level;
in response to determining a gap between the identified cybersecurity risk level and a pre-determined baseline level; and
refining the set of control measures for the digital project or the information asset so that the gap can be mitigated.

18. The computer system of claim 17, wherein the operations further comprise:
displaying the set of control measures to a cybersecurity operator on the enterprise network.

19. A non-transitory computer-readable medium comprising software instructions that, when executed, cause a computer processor to perform operations of:
monitoring a plurality of data sources that document (i) one or more digital projects, or (ii) one or more information assets, wherein the one or more digital project require access to the one or more information asset on an enterprise network, wherein the plurality of data sources are subject to constant updates as time elapses;
in response to an update, extracting, for each data source and using a natural language processing (NLP) module, an intent for a digital project, wherein the intent characterizes (i) how the digital project intends to access the information asset on the enterprise network, or (ii) how the information asset intends to be accessed through the enterprise network, and wherein the NLP module navigates semantic differences between the plurality of data sources;
identifying, for the digital project or the information asset, a cybersecurity risk level based on a correlation between a consolidated intent derived from consolidating the extracted intent from each of the plurality of data sources and historical records, each historical record comprising an extracted intent of past digital projects, corresponding cybersecurity risk level, and corresponding control measures;
based on, at least in part, the correlation between the consolidated intent and the historical records, matching the digital project, or the information asset, with a set of control measures; and
subsequently causing the set of control measures to be enforced on the enterprise network for the digital project or the information asset.

20. The non-transitory computer-readable medium of claim 19, wherein the operations further comprise:
launching software agents that automatically mine the plurality of data sources for records relating to each of the one or more digital projects,
wherein the records include records shared on an intranet of the enterprise and records released on social media outlets,
wherein the software agents are capable of detecting updates to the records as the updates become available, and
wherein each digital project involves multiple parties of the enterprise that author the records and the updates to the records.

* * * * *